United States Patent [19]

Hsu

[11] Patent Number: 5,150,997
[45] Date of Patent: Sep. 29, 1992

[54] ELASTIC CONNECTOR

[76] Inventor: Li J. Hsu, 4th Flr., No. 736 Ting Jou Rd., Taipei, Taiwan

[21] Appl. No.: 660,021

[22] Filed: Feb. 25, 1991

[51] Int. Cl.⁵ ............................................. F16B 21/00
[52] U.S. Cl. .................................. 411/511; 411/337; 411/918
[58] Field of Search .............. 411/511, 347, 918, 351, 411/524, 516, 337, 522, 523, 527, 190, 83, 87, 92, 96

[56] References Cited

U.S. PATENT DOCUMENTS

| | | | |
|---|---|---|---|
| 836,739 | 11/1906 | Dawson | 411/918 X |
| 1,154,642 | 9/1915 | Lawton | 411/918 X |
| 1,203,071 | 10/1916 | Straub | 411/918 X |
| 2,295,685 | 9/1942 | Place | 411/918 X |
| 2,391,650 | 12/1945 | Simmons | 411/918 X |
| 2,394,020 | 2/1946 | Soreny | 411/918 X |
| 2,593,064 | 4/1952 | Silberman | 411/918 X |
| 2,674,150 | 4/1954 | Flora | 411/918 X |
| 2,744,436 | 5/1956 | Ross | 411/511 |
| 3,402,947 | 9/1968 | Lewis | 411/511 X |

FOREIGN PATENT DOCUMENTS 1475388  8/1969  Fed. Rep. of Germany ...... 411/511

Primary Examiner—Rodney M. Lindsey
Attorney, Agent, or Firm—Lowe, Price, LeBlanc & Becker

[57] ABSTRACT

An elastic connector for holding mechanical parts firmly includes a base to accomodate an S-shaped spring piece and one unit of symmetrical steel sheets. On the upper direction of the base a supporting member is set to support the revolving of the control member, of which the two control rods are inserted into the S-shaped spring piece, while two fixing rods keep the steel sheets in a U-shaped condition. The upper direction of the control member is sealed by a lid which is fixed by a pair of rivets, only leaving a handle on the upper direction of the lid for operation purpose. When a spanner is sleeved onto the handle to revolve the control member, the two control rods of which will sandwich the two end plates of the S-shaped spring piece and drive them to move outward to enable the three holes to be arranged in a slanting formation, so as to produce a tightly squeezing function when passing through the outer wall of the rod member of the S-shaped spring piece, so as to hold the two firmly together. Owing to their sideward movement the other two fixing rods will release the control they exerted over the steel sheet, and thus enable the steel sheets to recover their L shape and squeeze tightly against the fixing rod, so as to prevent the control member from loosening.

13 Claims, 5 Drawing Sheets

ELASTIC CONNECTOR

BACKGROUND OF THE INVENTION

1. Field of the Invention

The invention relates to an elastic connector, which can easily be turned tightly to rapidly connect mechanical members together, as well as easily turned loosely to rapidly set mechanical members apart, to the ultimate effect of raising the elastic efficiency of mechanical members. The connector can also prevent screw nuts from loosening or falling off at the time of mechanical movement without the need to additionally lock them up with sliding plate rings.

2. Background of the Invention

A bolt is a mechanical part most frequently used in various kinds of machinery, utensils, apparatus, and various tools which are used everyday in the household. It provides endless utilization. No matter what its size or precision, no machinery can be built without it. On the other hand, a bolt is often used in coordination with a screw nut. When it is being used, first pass the bolt through the hole of the unit of mechanical members which it intends to fix. Then turn the screw nut onto the bolt with a spanner to fix the mechanical members together. Reversely, when the mechanical members have to be set apart, turn the screw nut off from the bolt with a spanner.

A screw nut will have to be turned for several rounds before it can be turned tightly onto or off from a bolt. Therefore, it is apparent that a screw nut is lacking of efficiency when it is being applied to fix or unfix something. Secondly, it would be rather inconvenient to turn a screw nut tightly on or off with certain spanners, such as a ring spanner and an open spanner. Because it has to be entirely pulled off and sleeved back every time when it is turned. At the same time, a screw nut will easily be worn and thus cause the spanner to slip off from it. Moreover, when it becomes rusted on the bolt, it can hardly be loosened from the bolt.

SUMMARY OF THE INVENTION

The object of this invention is to provide an elastic connector which can hold mechanical members tightly. By turning it slightly, the mechanical members can be easily held firmly together or set apart, and thus greatly increase the efficiency of assembling or disassembling.

Another object of this invention is to provide an elastic connector which can hold mechanical members tightly. The connector is able to prevent the screw nuts from loosening of falling off at the time of mechanical movement without the need to additionally lock it up with a sliding plate ring.

Still another object of this invention is to provide an elastic connector to hold mechanical members tightly, whereby the connector can be easily taken off from the mechanical members without worrying that the screw nut will become rusted on the bolt.

The technical contents and features through which this invention achieves the above-mentioned objects can be throughly understood by referring to the related diagramatic drawings set below.

DETAILED DESCRIPTION OF THE PREFERRED EMBODIMENT

Figure 1:
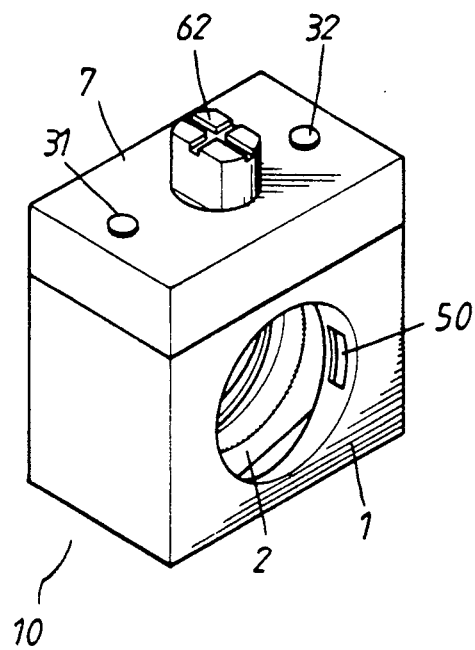
FIG. 1 is a perspective view of the outer appearance of the elastic connector presented in this invention.

The elastic connector 10 of this invention is indicated per the view of outer appearance shown in FIG. 1. The elastic connector 10 comprises a base 1. As indicated in the preferred embodiment in FIG. 2, the outer appearance of base 1 is roughly made in a square shape and comprises a hollow hole 11 which extends through in a straight line, and through which a rod member having the same outer diameter can pass through. The said rod member is made to coordinate with the use of the elastic connector 10 presented in this invention, with a function equivalent to that of a bolt. However, a male thread is deemed unnecessary because the elastic connector 10 presented in this invention is not firmly held by threads. The design of another outer appearance, such as a hexahedral shape of base 1, shall be included into the spirit and scope of this invention.

Figure 3:
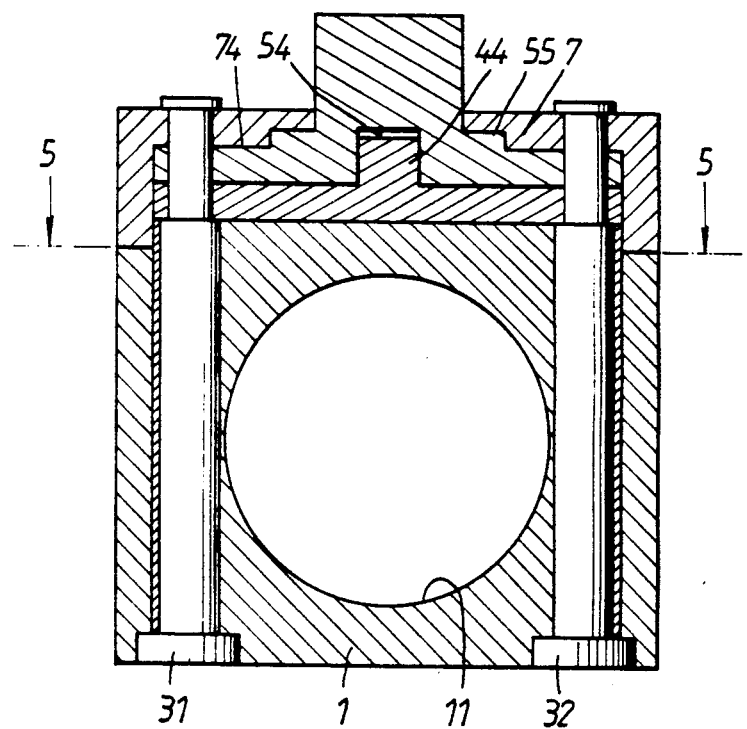
FIG. 3 is a sectional view of the elastic connector presented in this invention; wherein its cutting along the longitudinal shaft is indicated.
Figure 4:
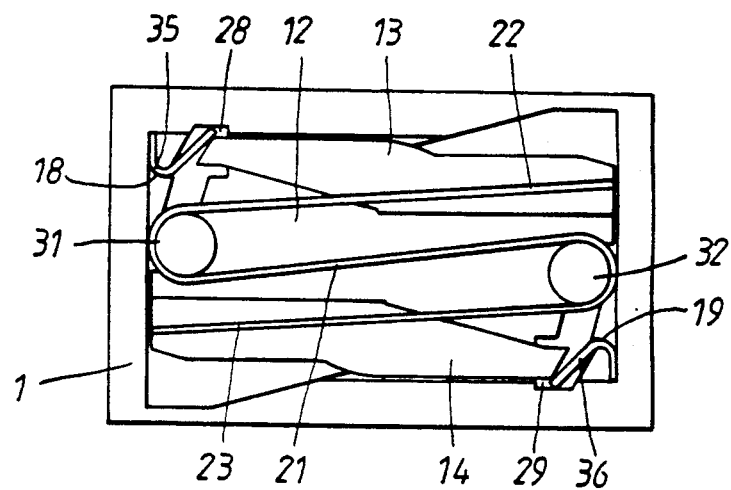
FIG. 4 is a top view of the elastic connector presented in this invention, wherein the condition after the lid has been taking away is indicated.

The interior of base 1 is hollow, the middle of which is partitioned off by a plate 12 into two wedge-shaped assembling grooves 13 and 14. Onto the middle of said plate 12 a slanting groove 15 is set, so as to allow the insertion of an S-shaped spring piece 2. When the S-shaped spring piece 2 is sleeved into the base 1, its middle plate 21 is sleeved into the slanting groove 15 and firmly held therein. While the two end plates 22 and 23 are separately placed into assembling grooves 13 and 14, and will further be sandwiched and driven by a control member 5 which will be described below. The S-shaped spring piece 2 further includes three holes 24, 25 and 26, the size of which is equivalent to that of the hollow hole 11 of the base 1. When the S-shaped spring piece 2 is sleeved into the base 1, it is under a state of compression to enable the three holes to be substantially coaxially aligned to allow the rod member to be smoothly placed inside as is shown in FIG. 4. The two ends of plate 12 are separately set with longitudinal holes 16 and 17 which extend through, both in their upward and downward directions. The said longitudinal holes are connected with the forementioned slanting groove 15 and permit rivets 31 and 32 to pass through in an upward direction. The extreme ends of the forementioned longitudinal holes 16 and 17 have larger internal diameters to recess the heads of rivets 31 and 32 and enable the bottom surface of base 1 to be kept in a plane shape as shown in FIG. 3.

In order to strengthen its firm holding capability, in the preferred embodiment a series of sawtooth shaped stripes 20 are provided at the periphery of holes 24, 25 and 26 of the S-shaped spring piece 2 to strengthen its squeezing effect against the outer wall of the rod member, and thus enable the two to be held more firmly together. Regarding the design of alternative shapes for holes 24, 25 and 16 of the S-shaped spring piece 2, a square or multi-edged design should also be included within the spirit and scope of this invention. If the holes of the S-shaped spring piece 2 are altered into another shape, the hollow hole 11 of the base 1 should also be altered into a corresponding shape. In the preferred embodiment, there are more than two holes on the middle plate 21 and end plates 22 and 23 of the S-shaped spring piece 2 to allow more than two of the rod members to pass through at the same time, and be fixed tightly by merely making use of one elastic connector 10. Of course, the hollow hole 11 of the forementioned base 1 should also be altered into more than two corresponding holes.

Figure 2:
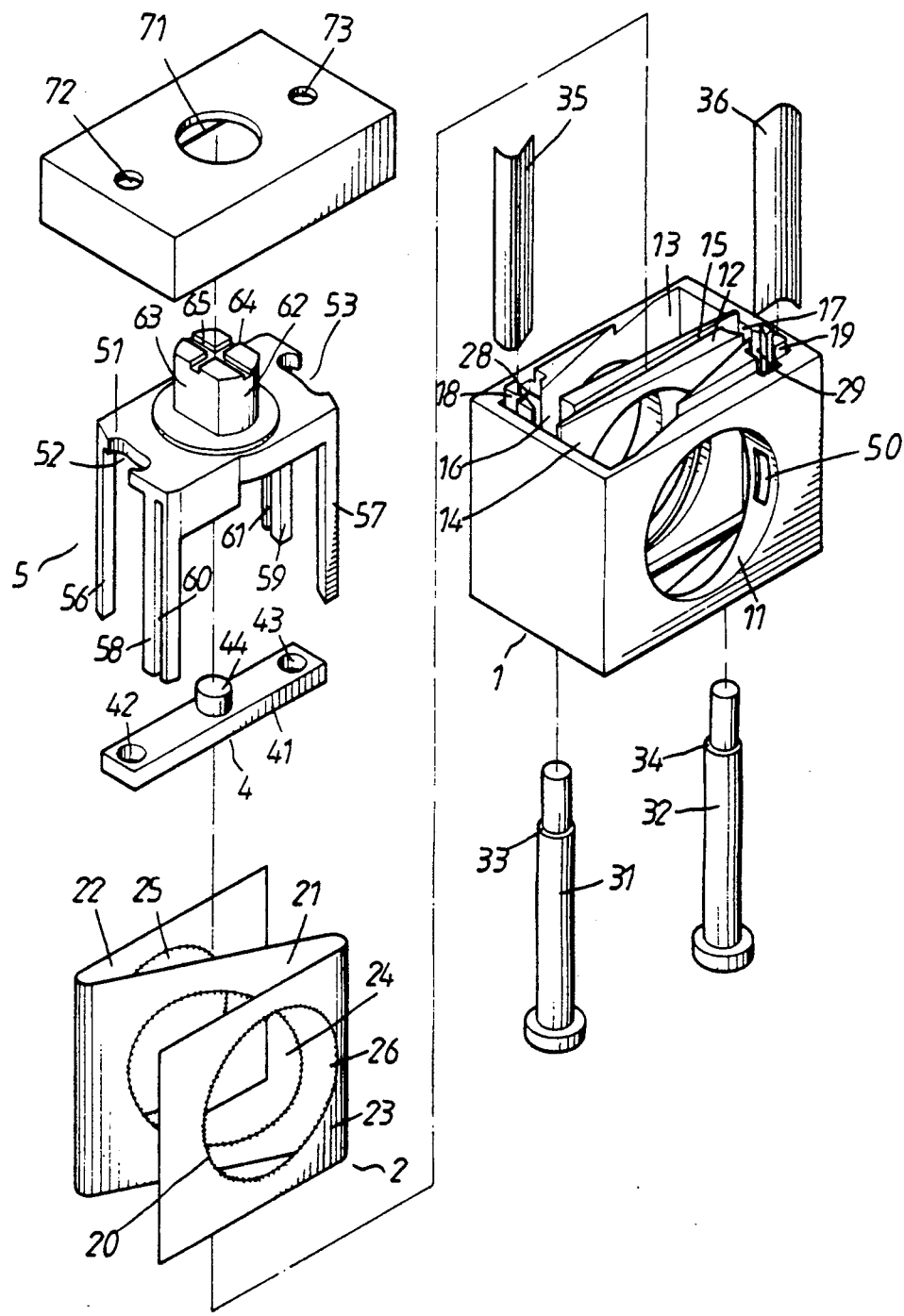
FIG. 2 is an exploded view of the structure of the elastic connector presented in this invention.

In the preferred embodiment in FIG. 2, the left upper angle of the base 1 is provided with a U-shaped groove 18 to allow the insertion of the steel sheet 35. In a similar manner, the right lower angle of the base 1 is also provided with an inverted U-shaped groove 19 to enable the insertion of another steel sheet 36. Of course, the opening direction of groove 19 at the right lower angle is opposite to that of groove 18 at the left upper angle. Both of them are facing outward, and the two are under a symmetrical condition. As shown in FIG. 2, steel sheets 35 and 36 are not yet packed into the base 1. Their outer appearance is roughly in an L shape. When they are already installed, they are kept under a U-shaped condition by the control member 5. By means of the spring force of steel sheets 35 and 36, the fixing rods 56 and 57 of the control member 5 will be squeezed against, so as to enable the control member 5 to keep in a horizontal condition to allow the three holes 24, 25 and 26 on the S-shaped spring piece 2 to from a straight line, and thus enable the rod member to pass through easily. The function of steel sheets 35 and 36 lies in setting a control over the control member 5, and thus prevent it from becoming loosened during its mechanical movement, so as to ensure the firm engagement of the mechanical parts; connected to which are holes 28 and 29 which are set at the internal lateral side of the U-shaped groove 18 and 19. In the first place the forementioned holes 28 and 29 will allow steel sheets 35 and 36 to be available with a space for a change in shape. Secondly, they will allow the insertion of the fixing rods 56 and 57 of the control member 5, as well as to allow them to move inside.

In order to support the control member 5 to revolve, a supporting member 4 is set on the base 1. The said supporting member 4 comprises a flat plate 41, the size of which is equivalent to that of plate 12 of the base 1, with small holes 42 and 43 separately set at each of its two ends; and through each of these two holes rivets 31 and 32 can be separately passed through, so as to place the supporting member 4 onto the necks 33 and 34 of rivets 31 and 32. Moreover, the central of the supporting member 4 extends upward to form an axle rod 44, so as to enable the control member 5 to revolve with the axle rod 4 as its axle center.

Another important assembling part of this invention is the control member 5, the lower part of which is installed in the interior of the base 1. It can also revolve to drive the two end plates 22 and 23 of the S-shaped spring piece 2. As indicated in FIG. 2, the said control member 5 comprises a base plate 51, at each of its two lateral sides is separately set with circular holes 52 and 53 to separately allow rivets 52 and 53 to pass through and, at the same time, allow the control member 5 to move within the angular area of said circular holes 52 and 53. Please refer to FIG. 3. It can be seen that the bottom surface of the forementioned base plate 51 is provided with an axle hole 54, which can be fitted onto the axle rod 44 of the supporting member 4, so as to surround the supporting member 4 for rotation. In the more preferred embodiment, the bottom surface of the base plate 51 is further set with a concaved part 55 to accomodate the supporting member 4. The width of said concaved part 55 is separately expanding outward from its central in a slanting way to enable the control member 5 to surround the axle rod 44 of the supporting member 4 for rotation. The left upper angle and the right lower angle of the base plate 51 extend separately downward to form the control rods 56 and 57, which can be inserted separately into holes 18 and 19 of the base 1. Upon the turning of the control member 5, the said fixing rod 56 and 57 can move inside the holes 18 and 19 to enable steel sheets 35 and 36 to transform from U shape to L shape.

Both the left lower angle and the right upper angle of the base plate 51 extend downward to form control rods 58 and 59, which can be separately inserted into the assembling grooves 12 and 13 of the base 1. Each of the control rods 58 and 59 has a gap 60 and 61 which extend to the base plate 51, so as to enable the separate insertion of end plates 22 and 23 of the S-shaped spring piece 2, so that upon the revolving of the control member 5, it will, at the same time, sandwich the end plates 22 and 23 of the S-shaped spring piece 2 to move outward. The central portion of base plate 51 extends upward to form a handle 62, which comprises at least one pair of opposed planes 63 and 64 which are set correspondingly to enable a spanner to be sleeved thereon for rotating the control member 5. Of course, handle 62 may either be made of a quadri-shape or hexadedral shape, so as to fit different types of spanners. In the more preferred embodiment, the top surface of said handle 62 may comprise a cross-shaped concaved groove 65 to enable the screw driver to tighten or loosen the control member 5.

The last assembling part of the elastic connector 10 is the lid 7, which have holes 71, 72 and 73 at each of its central part and its two ends, through which handle 61 and rivets 31 and 32 can be separately passed. As shown in FIG. 3, the bottom part of the lid 7 further comprises a concaved chamber 74 to encircle the base plate 51 of the control member 5. When the forementioned assembling parts are assembled according to the right order, the heads of rivets 31 and 32 are hammered to seal the elastic connector 10 tightly, and only leave the handle 62 to be exposed outside for operation. Its condition is indicated per the view of outer appearance in FIG. 1.

Figure 5:
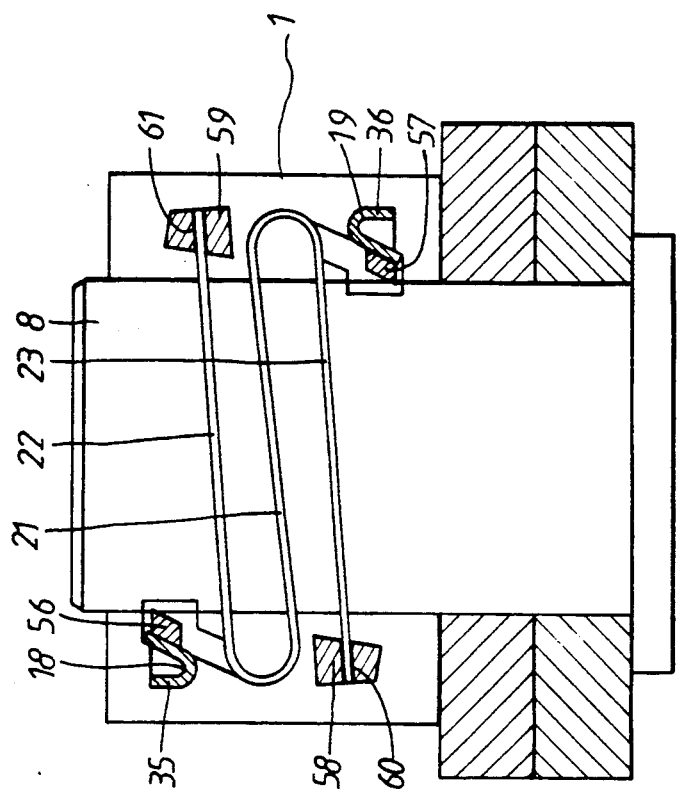
FIG. 5 is a sectional view taken along the line 5—5 in FIG. 3, wherein the passing of the rod member through an the elastic connector is indicated.
Figure 6:
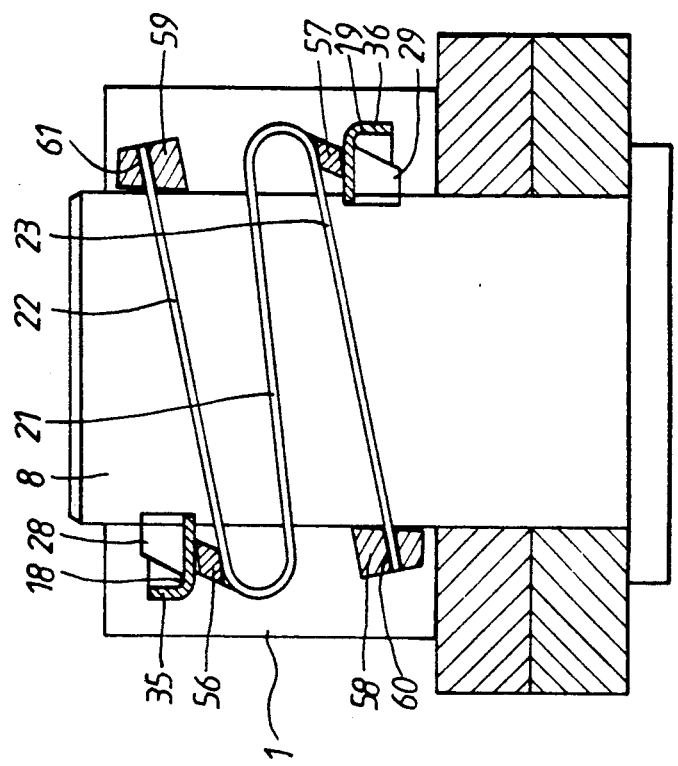
FIG. 6 is a sectional view similar in shape to that of FIG. 5 and showing how the three openings of the S-shaped spring piece at the rear side of the revolving control member are arranged slantingly in a firmly squeezing engagement with the rod member.

FIGS. 5 and 6 are used to illustrate how the elastic connector 10 of this invention is used to hold the mechanical parts tightly. Firstly, the elastic connector 10 is sleeved onto the rod member 8. Then sleeve onto the handle 62 and start to revolve it. At this time, the control rods 58 and 59 of the control member 5 will sandwich end plates 22 and 23 of the S-shaped spring piece 2 and cause them to move outward to enable the three holes 24, 25 and 26 of the S-shaped spring piece 2 to arrange in a slanting formation, and thus produce a tightly squeezing effect against the outer wall of the rod member 8. Its condition is indicated per FIG. 6, and thus achieve the effect of fixing. On the other hand, it will enable steel sheets 35 and 36 to recover their L shape, in which steel sheets 35 and 36 will release their limit as a result of the sideward moving of the fixing rods 56 and 57. This enables steel sheets 35 and 36 to recover their L shape and the lateral edge of said steel sheets 35 and 36 can be protruded outward through the window 50 of the hollow hole 11 to squeeze against the rod member 8, as well as to enable the rod member 8 to keep in a proper direction without leaning sideward, so that it will squeeze firmly against fixing rods 56 and 57 by means of its springing force. This prevents the control member 5 from loosening, so as to ensure the mechanical parts from falling off during its mechanical movement. The forementioned window 50 is formed by the inter-cutting of the hollow hole 11 of the base 1 and holes 28 and 29.

Upon the time of loosening the elastic connector 10, the control member 5 is turned. At this time, the fixing rods 56 and 57 will press the steel sheets 35 and 36 from L shape to U shape. While the control rods 58 and 59 will warp up the two end plates 22 and 23 of the S-shaped spring piece 2 toward an interior direction to enable the three holes 24, 25 and 26 to form a straight line, so as to release their firm hold of rod member 8 and enable the elastic connector 10 to easily unload, and thus allow the mechanical parts to be separated.

In spite of the fact that a specific preferred embodiment is described herein in coordination with the related diagrammatic drawings, it is apparent that such a preferred embodiment is only a small part of the many preferred embodiments which can well describe the spirit of this invention which is merely used as an example and description. Any different alterations which can easily be made by those who are familiar with this specific art should, such as what is contained in the claims which appear herein, be regarded as lying within the spirit and scope of this invention.

What is claimed is:

1. An elastic connector for securing mechanical parts together comprising:
  a) a hollow base having a hole extending through the front and rear thereof, and including within its interior two wedge-shaped assembling grooves, a plate partioning the assembling grooves, two U-shaped grooves positioned at opposite corners, a hole adjacent a lateral side of each U-shaped groove, a pair of longitudinal holes at opposite ends of the plate, and a slanting groove connecting the longitudinal holes;
  b) a pair of rivets received within the longitudinal holes;
  c) an S-shaped spring member installed within the base and including two ends, a middle plate disposed within the slanting groove, two end plates disposed within the assembling grooves, and a hole formed in each of the middle and end plates corresponding in size to the hole through the base;
  d) a pair of steel sheets disposed within the U-shaped grooves;
  e) a supporting member including a pair of holes positioned at two ends thereof for receiving the rivets therethrough and a central axle rod extending upwardly therefrom;
  f) a control member including a base plate, a pair of arc-shaped holes formed at each of two opposite ends for receiving the rivets therethrough and permitting the control member to move within the areas defined by the arc-shaped holes, a bottom surface defining a concavity for receiving the supporting ember, an axle hole for receiving the axle rod, a rod extending downwardly from each of four corners of the base plate, each of two rods being disposed within a groove hole for urging the steel sheets into a U-shaped configuration, each of the other two rods being provided with a longitudinal gap therethrough for receiving the two ends of the spring members, and a handle extending upwardly from the base plate for engagement by a spanner to rotate the control member; and
  g) a lid provided with a central hole and two end holes, the handle being disposed through the central hole and the rivets being disposed through the end holes, a bottom chamber, and the base plate of the control member being disposed within the bottom chamber.

2. The elastic connector of claim 1 wherein the periphery of each hole in the S-shaped spring member is provided with a series of tooth-shaped stripes.

3. The elastic connector of claim 1 wherein the handle includes a pair of opposed planar shaped sides for engagement by the spanner.

4. The elastic connector of claim 1 wherein the handle is of a multi-edge configuration.

5. The elastic connector of claim 1 wherein the top of the handle includes a cross-shaped groove.

6. The elastic connector of claim 1 wherein the periphery of the hole through the base includes two windows through which a lateral edge of each steel sheet may extend outwardly for engaging a rod member.

7. For holding mechanical parts together, an elastic connector comprising:
  a base, said base comprising a straight hollow hole through a front face thereof to a back face thereof, two wedge-shaped assembling grooves partitioned by a partition plate therein, a first U-shaped groove on an upper left corner thereof, a second U-shaped groove invertedly disposed on a lower right corner thereof, said partition plate comprising a pair of longitudinal holes at two opposite ends thereof, said pair of longitudinal holes being connected to each other by a slanting groove;
  a pair of rivets, said rivets being respectively inserted into said longitudinal holes on said partition plate;
  a S-shaped spring plate fastened inside said base, said S-shaped spring plate comprised of a middle plate portion inserted in said slanting groove, and two opposite end plate portions respectively inserted into said assembling grooves, said middle and end plate portions each having a hole in shape and size similar to said hollow hole on said base;
  a pair of steel sheets respectively fastened in said first and second U-shaped grooves;
  a supporting member, said supporting member having two small holes on two opposite ends thereof for inserting rivets;
  a control member, said control member comprising a base plate, said base plate comprising two circular holes at two opposite ends thereof for inserting said rivets, a recess on a bottom edge thereof for holding said supporting member, two fixing rods at either two corners thereof respectively inserted into holes on said base for compressing said steel sheets into U-shaped forms, two control rods at other two corners thereof with gaps for inserting said S-shaped spring plate, and a handle upstanding from a top edge thereof for rotating said control member by a tool;

a lid, said lid having holes for inserting said rivets and said handle respectively and a recess on a bottom edge thereof for holding said control member; and wherein rotating said control member in one direction causes said two end plate portions of said S-shaped spring plate to be respectively moved outwards by said control rods permitting an inserted rod member to be firmly retained in said hollow hole by said S-shaped spring plate, and simultaneously causes said fixing rods to allow said steel sheets to move back into their original L-shaped forms permitting them to laterally respectively project through two windows on said hollow hole in stopping against said rod member so as to firmly retain said rod member and said control member in place.

8. The elastic connector of claim 7, wherein embossed stripes are formed on said S-shaped spring plate around the holes thereon.

9. The elastic connector of claim 7, wherein said rivets each has a stop edge formed around and spaced from the plain end thereof for supporting said supporting member after the insertion of the plain end thereof into either hole on said supporting member.

10. The elastic connector of claim 7, wherein said supporting member further comprises an axle rod on a top edge thereof inserted in a recessed hole on said control member permitting said control member to be rotated thereon.

11. The elastic connector of claim 7, wherein said handle of said control member has at least two opposite side planes for engagement of a spanner.

12. The elastic connector of claim 7, wherein said handle of said control member comprises a crossed groove on a top edge thereof.

13. The elastic connector of claim 7, wherein said windows are bilaterally diagonally formed on said hollow hole permitting said L-shaped steel sheets to partly protrude therethrough in retaining said rod member and said control member in place.

* * * * *